(12) United States Patent
Honke et al.

(10) Patent No.: US 8,783,940 B2
(45) Date of Patent: Jul. 22, 2014

(54) KNEADING EXTRUDER HAVING A SPEED REGULATOR AND RESONANCE SUPPRESSOR

(75) Inventors: Koichi Honke, Kobe (JP); Koji Minagawa, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 990 days.

(21) Appl. No.: 12/735,985

(22) PCT Filed: Mar. 13, 2009

(86) PCT No.: PCT/JP2009/054854
§ 371 (c)(1),
(2), (4) Date: Aug. 30, 2010

(87) PCT Pub. No.: WO2009/116459
PCT Pub. Date: Sep. 24, 2009

(65) Prior Publication Data
US 2011/0002189 A1    Jan. 6, 2011

(30) Foreign Application Priority Data
Mar. 18, 2008  (JP) .................................. 2008-069643

(51) Int. Cl.
*B29B 7/58* (2006.01)
(52) U.S. Cl.
USPC ........................................... 366/100; 464/87
(58) Field of Classification Search
USPC ............ 366/69–100, 297–301; 425/200–209; 74/665 GA; 464/87
See application file for complete search history.

(56) References Cited

U.S. PATENT DOCUMENTS 3,894,725 A * 7/1975 Schafer .......................... 366/100
4,261,225 A * 4/1981 Zahradnik ................ 74/665 GA
4,679,461 A * 7/1987 Mizuguchi et al. ...... 74/665 GA (Continued)

FOREIGN PATENT DOCUMENTS

DE          3881243 T2     9/1993
DE    102005020961 A1    11/2006

(Continued)

OTHER PUBLICATIONS

International Search Report for Application PCT/JP2009/054854 mailed Apr. 14, 2009.

(Continued)

*Primary Examiner* — Charles Cooley
(74) *Attorney, Agent, or Firm* — Juan Carlos A. Marquez; Morris, Manning & Martin, LLP

(57) ABSTRACT

It is intended to provide a kneading extruder which makes it possible to prevent breakage due to resonance regardless of the rotating speed of kneading screws. The kneading extruder comprises a driving motor, kneading screws for kneading a material, each of the kneading screws having a screw shaft, a motive power transmitting path including a first speed regulator for varying a rotating speed produced by motive power output from the driving motor, the motive power transmitting path serving to transmit the motive power which produces a rotating speed varied by the first speed regulator to the screw shafts of the kneading screws, and a resonance suppressor for suppressing torsional resonance of the kneading screws caused by fluctuations in load exerted on the kneading screws, the resonance suppressor serving to reduce a resonance response factor which is the ratio of an output amplitude of the kneading screw amplified by resonance response to an input amplitude of the kneading screw caused by the fluctuations in load to suppress the torsional resonance.

7 Claims, 12 Drawing Sheets

(56) References Cited

U.S. PATENT DOCUMENTS

| | | | |
|---|---|---|---|
| 4,825,983 A | 5/1989 | Nakanishi | |
| 5,213,010 A * | 5/1993 | Hayafusa et al. | 74/665 GA |
| 5,511,874 A * | 4/1996 | Ikegami et al. | 366/100 |
| 5,941,634 A * | 8/1999 | Tynan et al. | 366/79 |
| 6,419,585 B1 | 7/2002 | Kimura | |
| 8,096,698 B2 * | 1/2012 | Yamaguchi et al. | 366/69 |
| 8,714,806 B2 * | 5/2014 | Naoi et al. | 366/100 |
| 2009/0010094 A1 | 1/2009 | Uemura | |
| 2009/0135016 A1 * | 5/2009 | Yamaguchi et al. | 340/635 |
| 2011/0002189 A1 * | 1/2011 | Honke et al. | 366/100 |

FOREIGN PATENT DOCUMENTS

| | | | |
|---|---|---|---|
| JP | 5-261792 | * | 10/1993 |
| JP | 5-321985 | * | 12/1993 |
| JP | 06-039900 | | 2/1994 |
| JP | 11-138528 | | 5/1999 |
| JP | 2000-170870 | | 6/2000 |
| JP | 2006-116959 | | 5/2006 |
| JP | 2006-272316 | | 10/2006 |

OTHER PUBLICATIONS

Office Action, from German Patent Office, issued in corresponding German Application Patent Application No. 11 2009 000 655.8, dated Jan. 2, 2012.

Office Action from Japanese Patent Office mailed Apr. 7, 2009 for Japanese Patent Application No. 2008-069643.

* cited by examiner

KNEADING EXTRUDER HAVING A SPEED REGULATOR AND RESONANCE SUPPRESSOR

TECHNICAL FIELD

The present invention relates to a kneading extruder.

BACKGROUND ART

Generally, in a twin-screw kneading extruder, composite resin material like a plastic compound is manufactured by feeding macromolecular resin pellets constituting base material and a powdered additive into a barrel and transferring the pellets and the additive downstream while kneading the same by means of a pair of kneading screws passed through the barrel. This kind of twin-screw kneading extruder employs a mechanism in which motive power of a driving motor is divided into two parts by a speed regulator and the divided parts of the motive power are transmitted to the individual kneading screws.

Rotational resistance exerted on the kneading screws when the kneading screws are rotated is not constant. Since this rotational resistance varies with a kneaded material type, the number of fins formed on each kneading screw and rotating speed thereof, fluctuations in load occur in the kneading screws due to changes in the rotational resistance.

The frequency of this kind of load fluctuations is correlated with the rotating speed of the kneading screws. Thus, the higher the rotating speed of the kneading screws, the higher the frequency of the load fluctuations. Particularly because there is a strong need for enhancing productivity in recent years, the twin-screw kneading extruder is often operated while rotating the kneading screws at a high rotating speed or varying the rotating speed of the kneading screws using an inverter control technique, for instance. Therefore, if the frequency of the load happens to coincide with the natural frequency of torsional motion of a rotary shaft system made up of the screws of the twin-screw kneading extruder and a shaft of the speed regulator, resonance can occur, causing an increased risk of breakage of kneading screw shafts or the speed regulator.

Means generally used for avoiding the occurrence of this kind of resonance is to vary the natural frequency. For example, Patent Document 1 cited below proposes such means that a torsion bar or a coupling mechanism is provided on a drive shaft of a driving motor and the natural frequency of a rotary shaft system of a twin-screw kneading extruder is varied by regulating stiffness of a portion by which a driving force is transmitted from the driving motor to a kneading screw side.

Inverter-driven, variable-speed-type twin-screw kneading extruders increasingly used in recent years, however, do not operate at a constant kneading screw rotating speed. Therefore, even if the natural frequency of the twin-screw kneading extruder is varied, there is still a high risk of the occurrence of resonance depending on operating conditions and it has not been possible to prevent the occurrence of resonance in a reliable fashion.

Patent Document 1: Japanese Unexamined Patent Publication No. 1999-138528

DISCLOSURE OF THE INVENTION

It is an object of the invention to provide a kneading extruder which overcomes the aforementioned problems.

It is another object of the invention to provide a kneading extruder which makes it possible to prevent breakage due to resonance regardless of the value of kneading screw rotating speed.

In one aspect of the invention, a kneading extruder comprises a driving motor, a kneading screw for kneading a material, the kneading screw having a shaft, a motive power transmitting path including a first speed regulator for varying a rotating speed produced by motive power output from the driving motor, the motive power transmitting path serving to transmit the motive power which produces a rotating speed varied by the first speed regulator to the shaft of the kneading screw, and a resonance suppressor for suppressing torsional resonance of the kneading screw caused by fluctuations in load exerted on the kneading screw, the resonance suppressor serving to reduce a resonance response factor which is the ratio of an output amplitude of the kneading screw amplified by resonance response to an input amplitude of the kneading screw caused by the fluctuations in load to suppress the torsional resonance.

BEST MODES FOR CARRYING OUT THE INVENTION

First Embodiment

A first embodiment of the present invention is now described with reference to the drawings.

Figure 1:
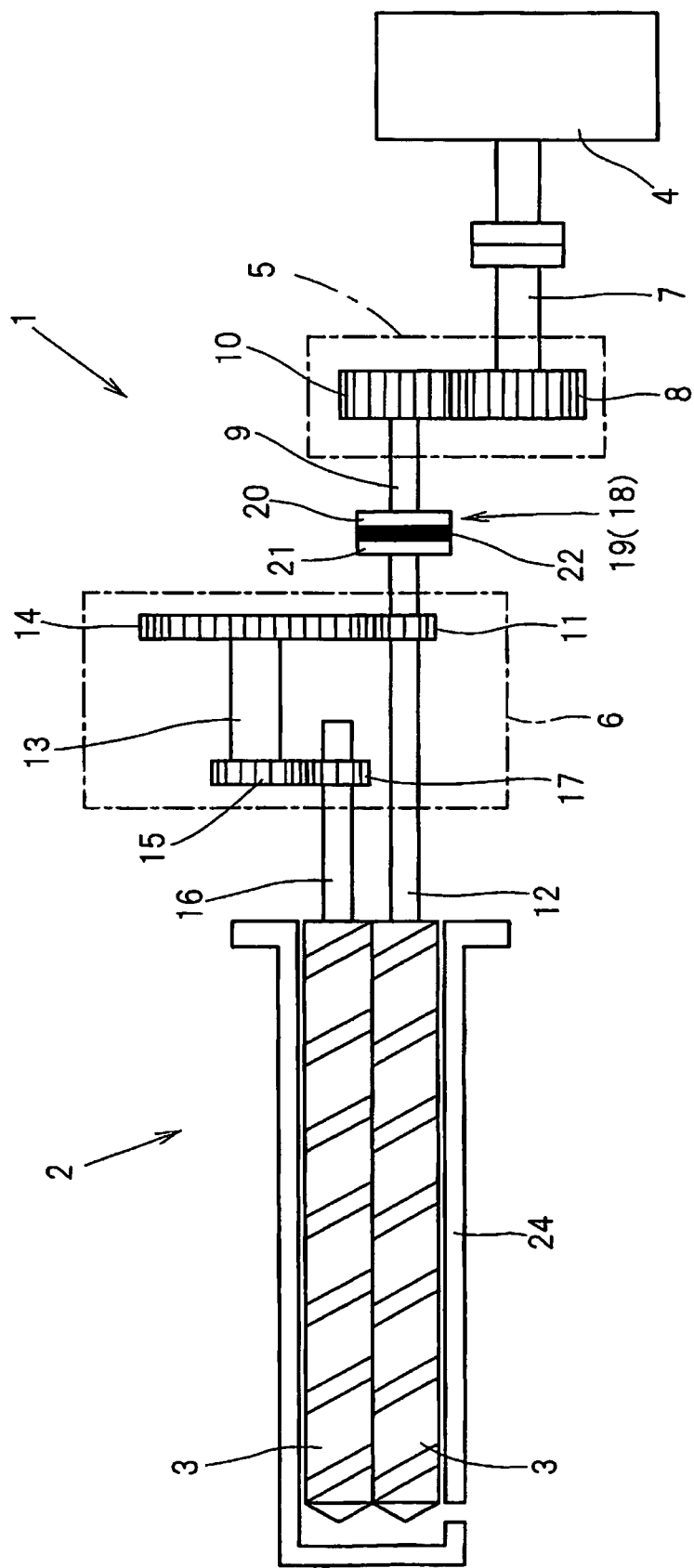
FIG. 1 is a frontal cross-sectional view of a twin-screw kneading extruder according to a first embodiment.

As schematically shown in FIG. 1, a twin-screw kneading extruder 2 of the first embodiment is of a co-rotation intermeshing type. The twin-screw kneading extruder 2 comprises a barrel 24 having a cavity inside, a pair of kneading screws 3 fitted within the barrel 24 and a motive power generation/transmission mechanism 1 for driving the kneading screws 3 to rotate.

In the following discussion, a left side as depicted in FIG. 1 is referred to as a downstream side of the twin-screw kneading extruder 2 and a right side as depicted in FIG. 1 is referred to as an upstream side thereof. Also, a left/right direction as depicted in FIG. 1 is referred to as an axial direction of the twin-screw kneading extruder 2.

The twin-screw kneading extruder 2 is configured such that a rotational driving force (motive power) produced by the motive power generation/transmission mechanism 1 is transmitted to the downstream side to rotate the pair of kneading screws 3 for kneading raw material in the barrel 24. Of this pair of kneading screws 3, one kneading screw 3 has a first screw shaft 12 while the other kneading screw 3 has a second screw shaft 16.

The motive power generation/transmission mechanism 1 includes a driving motor 4 for producing the motive power, a second speed regulator 5 for increasing or reducing the rotating speed of the driving motor 4, and a first speed regulator 6 for dividing the motive power which produces a rotating speed regulated by the second speed regulator 5 into two parts and transmitting the divided parts of the motive power to the individual kneading screws 3.

Accordingly, the motive power generation/transmission mechanism 1 has a motive power transmitting path which includes a drive shaft 7, the second speed regulator 5 and the first speed regulator 6. The motive power produced by the driving motor 4 is input into the second speed regulator 5 through the drive shaft 7, the motive power producing the rotating speed regulated by the second speed regulator 5 is input into the first speed regulator 6 through an output shaft 9 of the second speed regulator 5, the motive power is divided into two parts by the first speed regulator 6, and one divided part of the motive power is transmitted to the first screw shaft 12, while another divided part of the motive power is transmitted to the second screw shaft 16.

The driving motor 4 is a high-pressure-generating motor capable of producing the motive power which is high enough to rotate the kneading screws 3. The motive power produced by the driving motor 4 is transmitted to the second speed regulator 5 through the drive shaft 7.

Provided between the driving motor 4 and the first speed regulator 6, the second speed regulator 5 has a mechanism for varying the rotating speed of the drive shaft 7 and transmitting rotary motion thereof to the output shaft 9. Therefore, torque of the drive shaft 7 increased by speed regulation by the second speed regulator 5 is output to the first speed regulator 6 through the output shaft 9.

A first gear 8 and a second gear 10 constituting the second speed regulator 5 are larger in weight, thickness and radius than a third gear 11, a fourth gear 14, a fifth gear 15 and a sixth gear 17 of the first speed regulator 6 which will be later described. For this reason, the second speed regulator 5 has a larger moment of inertia than the first speed regulator 6 for input rotary motion.

The first speed regulator 6 includes the third gear 11, a floating shaft 13, the fourth gear 14, the fifth gear 15 and the sixth gear 17. In this first speed regulator 6, the torque input through the output shaft 9 is divided into two parts by the third gear 11, and one divided part of the torque is output to the second screw shaft 16 through the fourth gear 14, the floating shaft 13, the fifth gear 15 and the sixth gear 17, while the remaining part of the torque is output to the first screw shaft 12. The first speed regulator 6 transmits the torque to the second screw shaft 16 upon varying the rotating speed of the torque (motive power) input from the output shaft 9.

The motive power generation/transmission mechanism 1 of this embodiment is characterized in that the same has a resonance suppressor 18 provided in the motive power transmitting path for suppressing resonance which can occur due to fluctuations in load exerted on each of the kneading screws 3 by reducing a resonance response factor of torsional vibration concerning the load fluctuations.

The load fluctuations occur when each kneading screw 3 on which a flight is formed at a specified angle for kneading the raw material rotates, as the load exerted on each kneading screw 3 varies with changes in rotational phase of the flight. The load fluctuations are measured in the form of variations in torque.

When the frequency of torque variations (load fluctuations) approaches the natural frequency of torsional motion of a rotary shaft system of the twin-screw kneading extruder 2 made up of the kneading screws 3 and the speed regulator shafts (the output shaft 9 and the floating shaft 13), the twin-screw kneading extruder 2 goes into a near-resonating state. When the twin-screw kneading extruder 2 goes into the near-resonating state, the twin-screw kneading extruder 2 vibrates in such a fashion (mode) that the upstream side where the driving motor 4 and the first speed regulator 6 having a large moment of inertia does not vibrate so much whereas the kneading screws 3 on the downstream side vibrates severely.

Thus, in this embodiment, the resonance suppressor 18 is provided in the motive power transmitting path between the first speed regulator 6 and the second speed regulator 5, and the resonance response factor of the kneading screws 3 is reduced by decreasing vibrations by means of the resonance suppressor 18.

The resonance response factor is the ratio of the amplitude of vibration (output amplitude) of each kneading screw 3 to the load fluctuation (input amplitude) of each kneading screw 3 during resonance. In other words, the resonance response is the ratio of the output amplitude of each kneading screw 3 amplified by resonance response to the input amplitude of each kneading screw 3 caused by the load fluctuation exerted on each kneading screw 3. The input amplitude is measured as the amplitude of torque variations occurring on each kneading screw 3 due to the load fluctuations, and the output amplitude is the amplitude of vibration of each kneading screw 3 during resonance.

It is possible to provide the aforementioned resonance suppressor 18 at any of various positions in the motive power transmitting path.

The resonance suppressor 18 may be provided downstream of the driving motor 4 in the motive power transmitting path as shown in FIG. 1, for example. The driving motor 4 has a larger mass (moment of inertia) than other members in the motive power transmitting path and is prone to act as a fixed end when vibrating. Thus, it is preferable that the resonance suppressor 18 be located downstream of the driving motor 4 in the motive power transmitting path in which vibrations are likely to occur.

Figure 2:
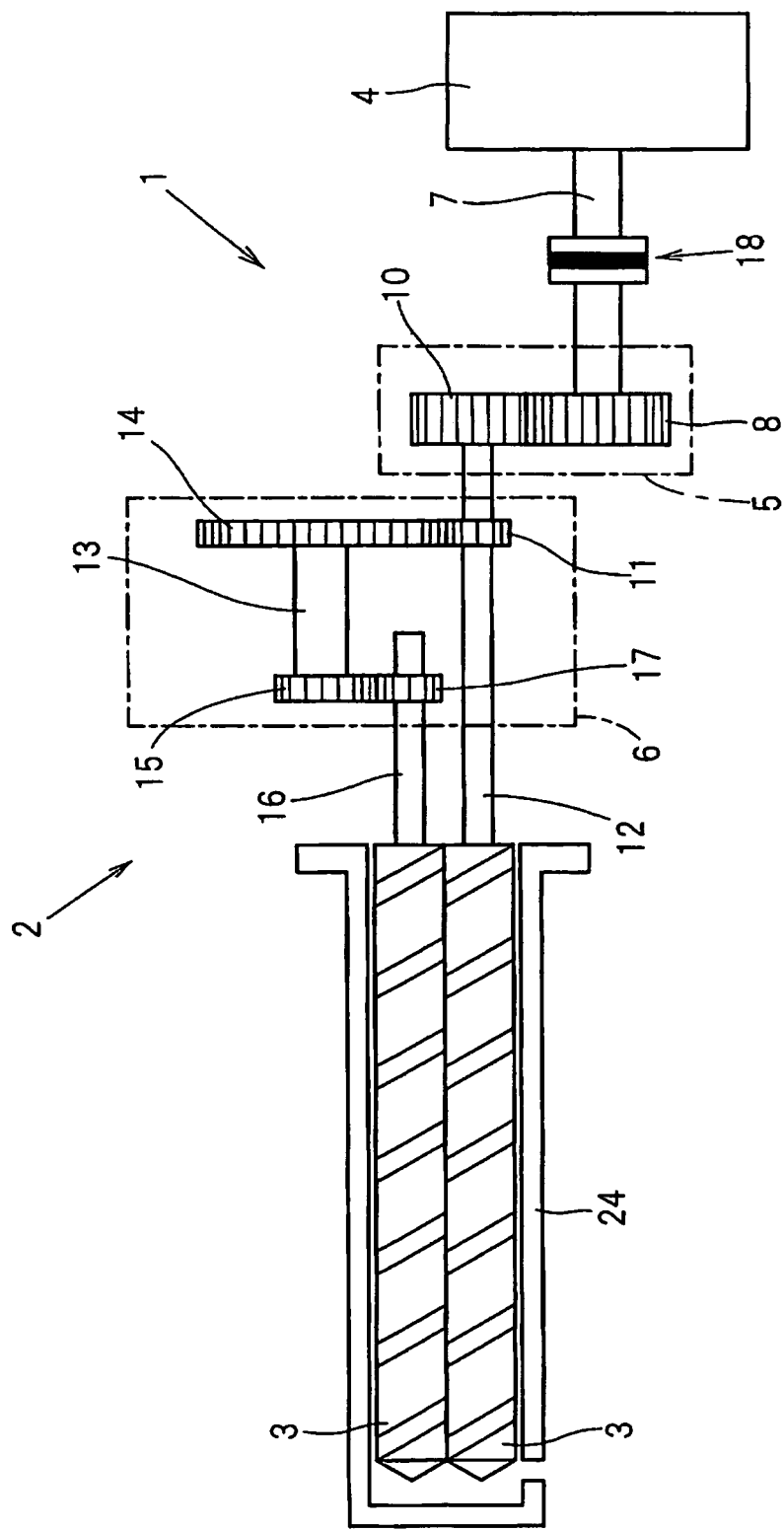
FIG. 2 is a frontal cross-sectional view of another twin-screw kneading extruder of which resonance suppressor is located at a different mounting position from the twin-screw kneading extruder shown in FIG. 1.

In a case where the second speed regulator 5 provided in the motive power transmitting path has as large a moment of inertia as the driving motor 4, the resonance suppressor 18 may be provided between the driving motor 4 and the second speed regulator 5 in the motive power transmitting path as shown in FIG. 2.

Figure 3:
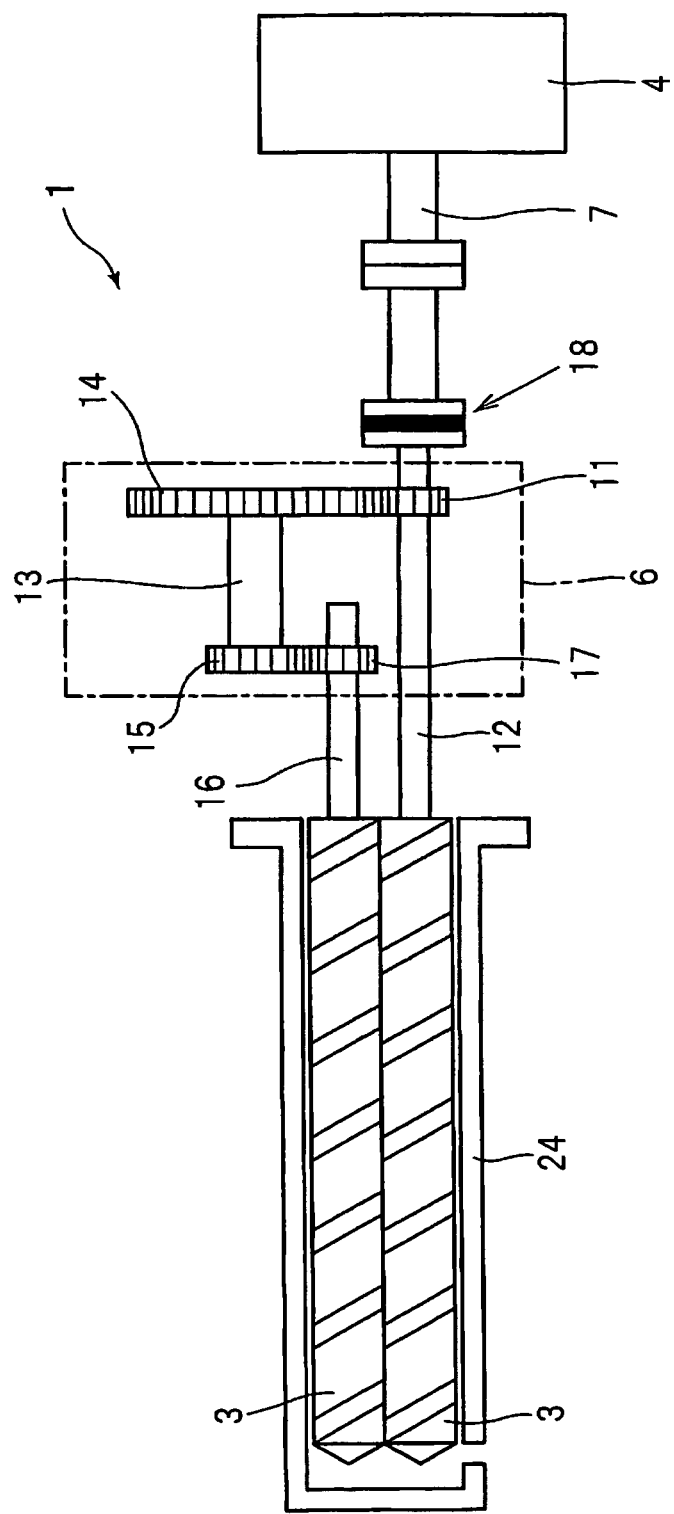
FIG. 3 is a frontal cross-sectional view of still another twin-screw kneading extruder of which resonance suppressor is located at a different mounting position from the twin-screw kneading extruder shown in FIG. 1.

Also, if the second speed regulator 5 is not provided in the motive power generation/transmission mechanism 1 and the motive power of the driving motor 4 is directly input into the first speed regulator 6, the resonance suppressor 18 may be provided between the driving motor 4 and the first speed regulator 6 in the motive power transmitting path as shown in FIG. 3.

Furthermore, the motive power transmitting path includes an input shaft through which the motive power is input into the resonance suppressor 18 and an output shaft through which the motive power is output from the resonance suppressor 18, and the resonance suppressor 18 is configured to couple the input shaft and the output shaft to each other by a viscoelastic medium or a viscous medium. A tirelike coupling 19 shown in FIG. 4 or a hydraulic coupling 23 shown in FIG. 5 is usable as this kind of resonance suppressor 18.

Figure 4:
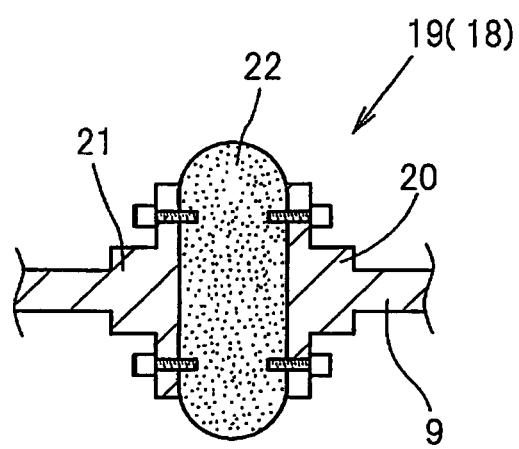
FIG. 4 is an enlarged cross-sectional view of a resonance suppressor applicable to the first embodiment.

As depicted in FIG. 4, the tirelike coupling 19 includes a first coupling element 20 provided on the input shaft, a second coupling element 21 provided on the output shaft and a viscoelastic element 22 sandwiched between the first coupling element 20 and the second coupling element 21.

Figure 5:
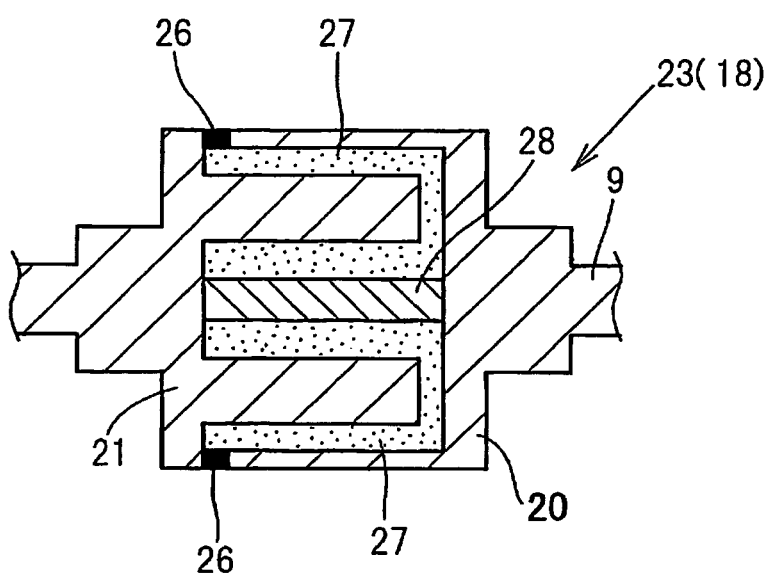
FIG. 5 is an enlarged cross-sectional view of another resonance suppressor applicable to the first embodiment.
Figure 6:
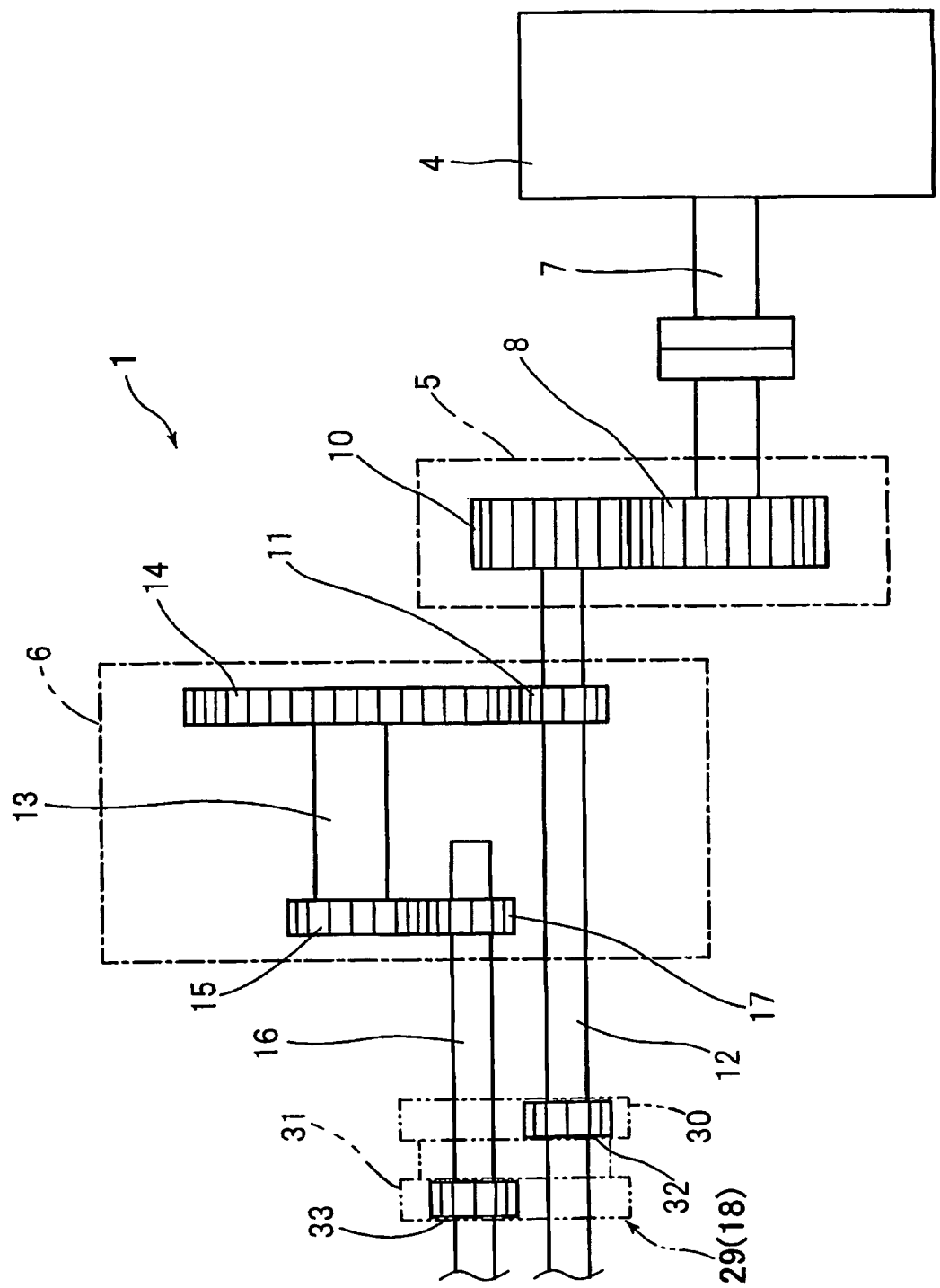
FIG. 6 is a frontal cross-sectional view of a motive power generation/transmission mechanism according to a second embodiment.

As depicted in FIG. 5, the hydraulic coupling 23 includes a first coupling element 20 provided on the input shaft, a second coupling element 21 provided on the output shaft, a seal member 26 placed between the first coupling element 20 and the second coupling element 21 for sealing off an outer peripheral part of a space between the two coupling elements 20, 21, a viscous fluid 27 sealed in the space between the two coupling elements 20, 21 by the seal member 26, and a torsion bar 28 which can couple (flexibly join) the first coupling element 20 and the second coupling element 21 with a capability to transmit the motive power between the two coupling elements 20, 21.

In either of the tirelike coupling 19 and the hydraulic coupling 23, the first coupling element 20 and the second coupling element 21 are arranged face to face with each other with a fixed distance in between, the two coupling elements 20, 21 being coupled by the viscoelastic element 22 or the viscous fluid 27.

Accordingly, even if the aforementioned rotary shaft system produces torsional resonance due to fluctuations in load torque exerted on each screw, elastic deformation or heat generation occurs in the viscoelastic element 22 or the viscous fluid 27, whereby vibrational energy is converted into thermal energy and vibration is attenuated. As a consequence, either of the tirelike coupling 19 and the hydraulic coupling 23 can reduce the resonance response factor.

Second Embodiment

Next, a twin-screw kneading extruder 2 provided with a motive power generation/transmission mechanism 1 according to a second embodiment is described.

As shown in FIGS. 6 to 11, the twin-screw kneading extruder 2 of the second embodiment differs from that of the first embodiment in the configuration of the motive power generation/transmission mechanism 1. The motive power generation/transmission mechanism 1 of the second embodiment differs from that of the first embodiment in that a pair of screw shafts 12, 16 is provided with a resonance suppressor 18 differing from that of the first embodiment. It is to be noted that the configuration and operational and working effects of the motive power generation/transmission mechanism 1 of the second embodiment are otherwise the same as those of the first embodiment.

The resonance suppressor 18 provided in the motive power generation/transmission mechanism 1 of the second embodiment is made up of a phase difference damper 29 for reducing a phase difference of load fluctuations (torque variations) between the first screw shaft 12 and the second screw shaft 16.

Figure 7:
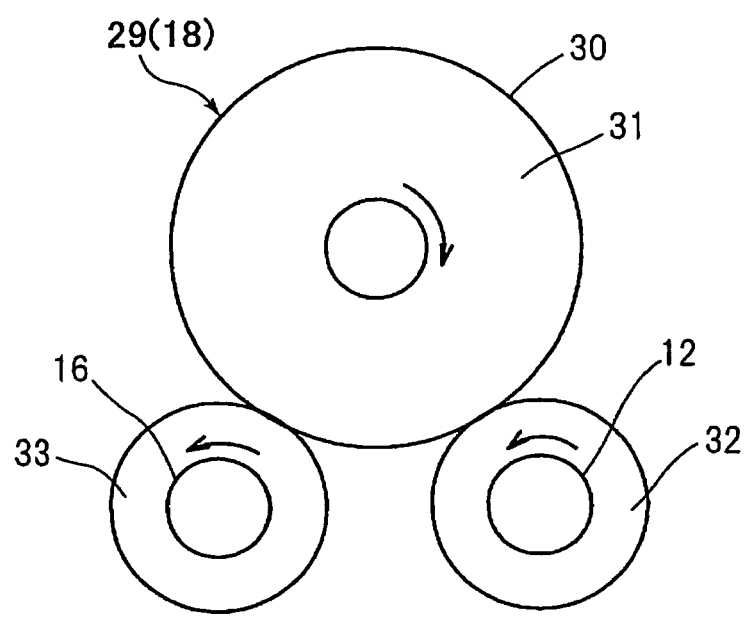
FIG. 7 is a side view of a phase difference damper.
Figure 8:
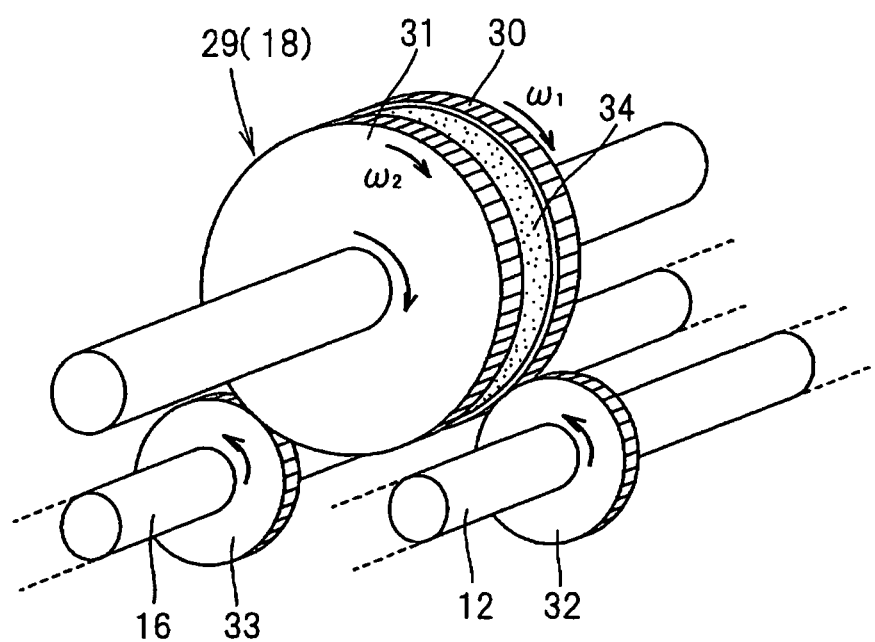
FIG. 8 is a perspective view of the phase difference damper.

As shown in FIGS. 7 and 8, the phase difference damper 29 includes a first synchronizing gear 30 which rotates in synchronism with the first screw shaft 12, a second synchronizing gear 31 which is arranged face to face with the first synchronizing gear 30 and rotates in synchronism with the second screw shaft 16, and a viscoelastic element 34 placed between the two synchronizing gears 30, 31. The first synchronizing gear 30 is meshed with a first transmission gear 32 mounted on the first screw shaft 12 and the second synchronizing gear 31 is meshed with a second transmission gear 33 mounted on the second screw shaft 16.

The first transmission gear 32 and the second transmission gear 33 are offset by a specific distance in a shaft axis direction. Therefore, the first synchronizing gear 30 meshed with the first transmission gear 32 and the second synchronizing gear 31 meshed with the second transmission gear 33 are also offset from each other by a specific distance in the axial direction. Each of the first transmission gear 32 and the second transmission gear 33 has a plurality of teeth formed on an outer periphery and these two transmission gears 32, 33 have the same number of teeth, the same tooth-to-tooth pitch and the same outer diameter which is defined by the teeth of the two transmission gears 32, 33. Each of the first synchronizing gear 30 and the second synchronizing gear 31 also has a plurality of teeth formed on an outer periphery and these two synchronizing gears 30, 31 have the same number of teeth, the same tooth-to-tooth pitch and the same outer diameter which is defined by the teeth of the two synchronizing gears 30, 31.

Figure 9:
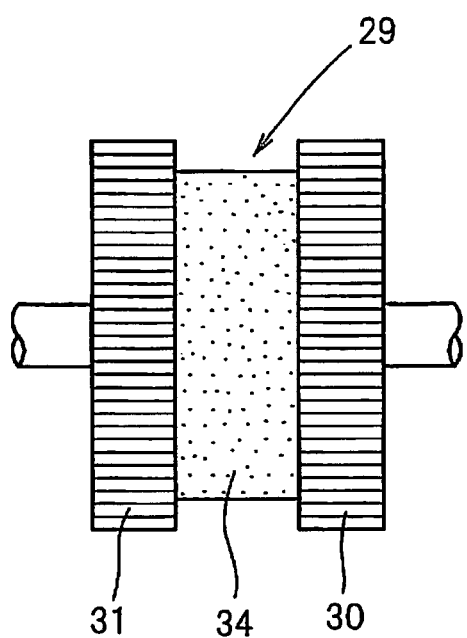
FIG. 9 is an enlarged cross-sectional view of a resonance suppressor applicable to the second embodiment.

As depicted in FIG. 9, the viscoelastic element 34 used in the phase difference damper 29 is formed by an elastic material like rubber, elastically joining the first synchronizing gear 30 and the second synchronizing gear 31 to each other.

When the first screw shaft 12 and the second screw shaft 16 rotate at the same rotating speed under conditions where no torsional vibrations exist, the first transmission gear 32 and the second transmission gear 33 also rotate at the same rotating speed. In this case, the first synchronizing gear 30 meshed with the first transmission gear 32 and the second synchronizing gear 31 meshed with the second transmission gear 33 in the phase difference damper 29 rotate at the same rotating speed.

On the other hand, if torques fluctuating with different timings are input into the first screw shaft 12 and the second screw shaft 16 when the first screw shaft 12 and the second screw shaft 16 rotate in the same direction as shown in FIG. 8, the first synchronizing gear 30 rotates at a rotating speed $\omega_1$ while the second synchronizing gear 31 rotates at a rotating speed $\omega_2$, for example, due to torsional vibrations, thereby causing a difference in torque variation timing between the first synchronizing gear 30 and the second synchronizing gear 31. It follows that a difference in rotating speed occurs between the first screw shaft 12 and the second screw shaft 16 and, as a result, a difference in rotating speed occurs between the first synchronizing gear 30 and the second synchronizing gear 31. In this embodiment, there arises an elastic force, or restoring force, in the viscoelastic element 34 in a direction in which the rotating speed of the first synchronizing gear 30 and the rotating speed of the second synchronizing gear 31 are matched with each other, that is, in a direction in which the difference in rotating speed between the first synchronizing gear 30 and the second synchronizing gear 31 is canceled out. As a consequence, the difference in rotating speed between the first screw shaft 12 and the second screw shaft 16 is canceled out and the resonance response factor of the kneading screws 3 is reduced.

Incidentally, a viscous member made of viscous material may be used in the phase difference damper 29 instead of the viscoelastic element 34. In this case, if a difference in rotating speed occurs between the two screw shafts 12, 16, causing a difference in rotating speed between the two synchronizing gears 30, 31, the viscous member exerts a viscosity force, or damping force, on the two synchronizing gears 30, 31 in a direction in which the difference in rotating speed between the two synchronizing gears 30, 31 is reduced. As a consequence, the difference in rotating speed occurs between the two screw shafts 12, 16 is reduced and the resonance response factor of the kneading screws 3 is reduced.

Figure 10:
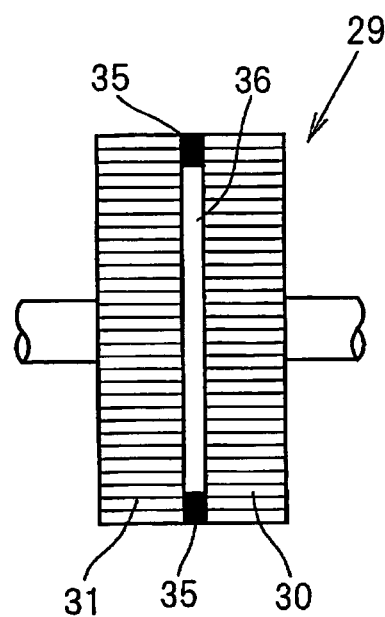
FIG. 10 is an enlarged cross-sectional view of another resonance suppressor applicable to the second embodiment.
Figure 11:
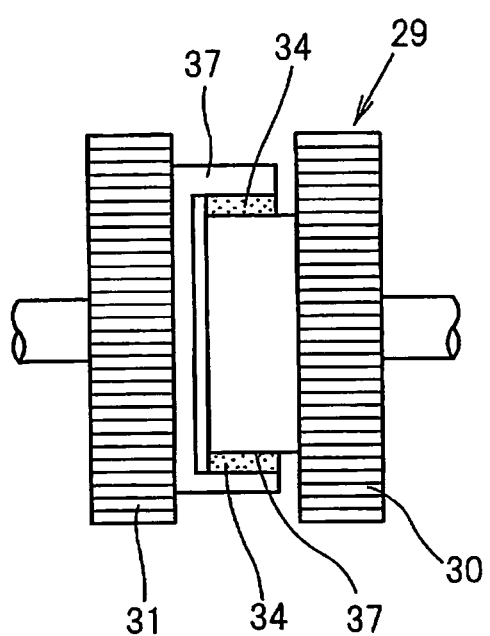
FIG. 11 is an enlarged cross-sectional view of still another resonance suppressor applicable to the second embodiment.

Besides an arrangement shown in FIG. 9, the phase difference damper 29 may be configured as shown in FIG. 10 or 11, for example.

Specifically, there may be provided a seal member 35 between the first synchronizing gear 30 and the second synchronizing gear 31 for sealing off an outer peripheral part of a space between the two synchronizing gears 30, 31 as well as a viscoelastic fluid 36 sealed in the space between the two synchronizing gears 30, 31 by the seal member 35 as shown in FIG. 10, so that the viscoelastic fluid 36 produces a damping force exerted between the first synchronizing gear 30 and the second synchronizing gear 31 for reducing any difference in rotating speed between these synchronizing gears 30, 31.

Also, there may be provided one cylindrical part 37 on a surface of the second synchronizing gear 31 facing the first synchronizing gear 30, another cylindrical part 37 to be loosely fitted into the first cylindrical part 37 on a surface of the first synchronizing gear 30 facing the second synchronizing gear 31, and further a viscoelastic element 34 between the pair of inner and outer cylindrical parts 37 as shown in FIG. 11, so that the viscoelastic element 34 produces a damping force exerted between the first synchronizing gear 30 and the second synchronizing gear 31 for reducing any difference in rotating speed between these synchronizing gears 30, 31.

Figure 12:
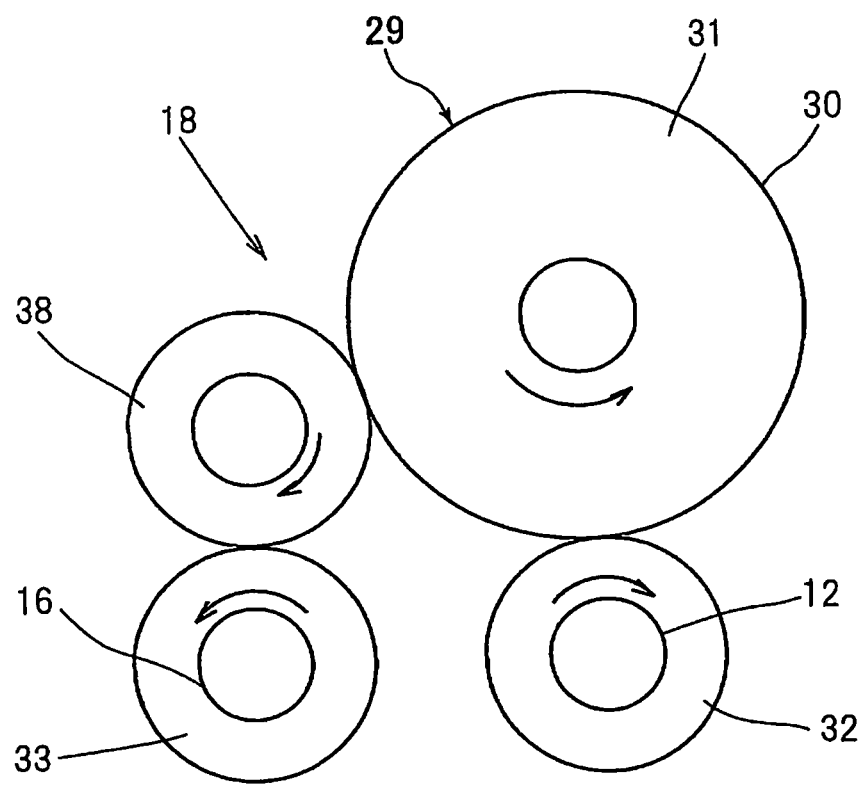
FIG. 12 is a frontal cross-sectional view of a motive power generation/transmission mechanism adopted when rotating directions of a pair of screw shafts differ from each other.

Furthermore, the motive power generation/transmission mechanism 1 of the second embodiment can also be used in a case where the first screw shaft 12 and the second screw shaft 16 rotate in opposite directions as shown in FIG. 12.

Specifically, there may be provided a third transmission gear 38 between the second transmission gear 33 and the second synchronizing gear 31 so that the third transmission gear 38 and the phase difference damper 29 together constitute the resonance suppressor 18. Moreover, the third transmission gear 38 shown in FIG. 12 may be positioned between the first transmission gear 32 and the first synchronizing gear 30 so that the third transmission gear 38 and the phase difference damper 29 together constitute the resonance suppressor 18.

This arrangement makes it possible to cause the first synchronizing gear 30 and the second synchronizing gear 31 to rotate in the same direction by means of the third transmission gear 38 and reduce the resonance response factor of the kneading screws 3 even when the first screw shaft 12 and the second screw shaft 16 rotate in opposite directions.

The present invention is not limited to the aforementioned individual embodiments but is variable as appropriate in terms of the shape, structure and material of individual members as well as combination thereof insofar as such variations do not alter essential nature of the invention.

For example, the foregoing embodiments present the completely intermeshing twin-screw kneading extruders 2 as illustrative examples of kneading extruders. The invention may however be applied to a kneading extruder with a single screw, or three or more screws, as well as to a twin-screw kneading extruder of a type other than the completely intermeshing type. Additionally, the invention is also applicable to a continuous kneading extruder.

Incidentally, when the invention is applied to a single-screw kneading extruder, it is desirable to omit the kneading screw 3 having the first screw shaft 12 from the twin-screw kneading extruder 2 shown in the foregoing first embodiment while leaving the kneading screw 3 having the second screw shaft 16 and structure the barrel 24 into an appropriate shape in which the raw material can be kneaded by the single kneading screw 3 within the barrel 24. Also, when the invention is applied to a kneading extruder with three or more screws, it is desirable to increase the number of kneading screws 3 in the twin-screw kneading extruder 2 shown in the foregoing first embodiment, structure the barrel 24 into an appropriate shape in which the raw material can be kneaded by the increased number of kneading screws 3 within the barrel 24, and then increase the number of branches into which the motive power is divided by the first speed regulator 6 so that the motive power is distributed to the individual kneading screws 3.

SUMMARY OF THE EMBODIMENTS

The foregoing embodiments can be summarized as described hereinbelow.

Specifically, a kneading extruder according to the present invention comprises a driving motor, a kneading screw for kneading a material, the kneading screw having a shaft, a motive power transmitting path including a first speed regulator for varying a rotating speed produced by motive power output from the driving motor, the motive power transmitting path serving to transmit the motive power which produces a rotating speed varied by the first speed regulator to the shaft of the kneading screw, and a resonance suppressor for suppressing torsional resonance of the kneading screw caused by fluctuations in load exerted on the kneading screw, the resonance suppressor serving to reduce a resonance response factor which is the ratio of an output amplitude of the kneading screw amplified by resonance response to an input amplitude of the kneading screw caused by the fluctuations in load to suppress the torsional resonance.

The inventors have figured out that it might be possible to prevent breakage of the shaft of the kneading screw and the speed regulator if the amplitude of vibration of the kneading screw could be reduced when the kneading screw went into a near-resonating state. The inventors have then succeeded in completing the embodiments knowing that breakage of the kneading extruder can be effectively avoided with the provision of the resonance suppressor for reducing the resonance response factor of the kneading screw.

To be more specific, even if the kneading extruder goes into the near-resonating state due to the load fluctuations, resonance occurring in the kneading screw would never increase to such an extent that causes breakage of the kneading extruder because the resonance response factor of the kneading screw is reduced by the resonance suppressor in the kneading extruder of the foregoing embodiments. Accordingly, it is possible to prevent the breakage of the kneading extruder due to resonance in the embodiments regardless of the rotating speed of the kneading screw.

Incidentally, it is preferable that the resonance suppressor be provided between the driving motor and the first speed regulator in the motive power transmitting path.

Also, if the motive power transmitting path includes a second speed regulator provided between the driving motor and the first speed regulator, the second speed regulator having a larger moment of inertia than that of the first speed regulator for input rotary motion, it is preferable that the resonance suppressor be provided between the first speed regulator and the second speed regulator in the motive power transmitting path.

Furthermore, the kneading extruder may be such that the motive power transmitting path includes an input shaft through which the motive power is input into the resonance suppressor and an output shaft through which the motive power is output from the resonance suppressor, and the resonance suppressor couples the input shaft and the output shaft to each other, the resonance suppressor including a viscoelastic medium or a viscous medium which permits relative rotary motion of the input shaft and the output shaft.

On the other hand, if the kneading extruder comprises a pair of kneading screws, the first speed regulator divides the motive power output from the driving motor into two parts and the motive power transmitting path transmits the two parts of the motive power divided by the first speed regulator to the shafts of the respective kneading screws, the resonance suppressor may be configured with a phase difference damper for reducing a phase difference of the load fluctuations between the shafts of the two kneading screws.

Furthermore, the kneading extruder may be such that the phase difference damper includes a pair of synchronizing gears which rotate in synchronism with the respective shafts and are arranged face to face with each other, and a viscoelastic element which is placed between the two synchronizing gears and exerts a force on the two synchronizing gears in a direction for canceling out a difference in rotating speed caused between the two synchronizing gears.

Moreover, the kneading extruder may be such that the phase difference damper includes a pair of synchronizing gears which rotate in synchronism with the respective shafts and are arranged face to face with each other, and a viscous member which is placed between the two synchronizing gears and exerts a force on the two synchronizing gears in a direction for reducing a difference in rotating speed caused between the two synchronizing gears.

The invention claimed is:

1. A kneading extruder comprising:
   a driving motor;
   a pair of kneading screws for kneading a material, each of the kneading screws having a shaft;
   a motive power transmitting path including a first speed regulator for varying a rotating speed produced by motive power output from said driving motor and a second speed regulator provided between said driving motor and said first speed regulator, said motive power transmitting path serving to transmit the motive power which produces a rotating speed varied by said first speed regulator, said first speed regulator being configured to divide the motive power output from said driving motor into two parts so as to transmit the two parts of the motive power to respective ones of the shafts of said pair of kneading screws, said second speed regulator having a larger moment of inertia than that of said first speed regulator for input rotary motion; and
   a resonance suppressor for suppressing torsional resonance of said pair of kneading screws caused by fluctuations in load exerted on the kneading screws, the resonance suppressor serving to reduce a resonance response factor which is the ratio of an output amplitude of the kneading screws amplified by resonance response to an input amplitude of the kneading screws caused by the fluctuations in load to suppress the torsional resonance, said resonance suppressor is provided between said first speed regulator and said second speed regulator in said motive power transmitting path.

2. The kneading extruder according to claim 1, wherein said motive power transmitting path includes an input shaft through which the motive power is input into said resonance suppressor and an output shaft through which the motive power is output from said resonance suppressor, and said resonance suppressor couples the input shaft and the output shaft to each other, said resonance suppressor including a viscoelastic medium or a viscous medium which permits relative rotary motion of the input shaft and the output shaft.

3. The kneading extruder according to claim 1, wherein said resonance suppressor is configured with a phase difference damper for reducing a phase difference of the load fluctuations between the shafts of said two kneading screws.

4. The kneading extruder according to claim 3, wherein said phase difference damper includes a pair of synchronizing gears which rotate in synchronism with the respective shafts and are arranged face to face with each other, and a viscoelastic element which is placed between said two synchronizing gears and exerts a force on said two synchronizing gears in a direction for canceling out a difference in rotating speed caused between said two synchronizing gears.

5. The kneading extruder according to claim 3, wherein said phase difference damper includes a pair of synchronizing gears which rotate in synchronism with the respective shafts and are arranged face to face with each other, and a viscous member which is placed between said two synchronizing gears and exerts a force on said two synchronizing gears in a direction for reducing a difference in rotating speed caused between said two synchronizing gears.

6. A kneading extruder, comprising:
   a driving motor;
   a pair of kneading screws for kneading a material, each of the kneading screws having a shaft;
   a motive power transmitting path including a first speed regulator for varying a rotating speed produced by motive power output from said driving motor and a second speed regulator provided between said driving motor and said first speed regulator, said motive power transmitting path serving to transmit the motive power which produces a rotating speed varied by said first speed regulator, said first speed regulator being configured to divide the motive power output from said driving motor into two parts so as to transmit the two parts of the motive power to respective ones of the shafts of said pair of kneading screws, said second speed regulator having a larger moment of inertia than that of said first speed regulator for input rotary motion; and
   a resonance suppressor for suppressing torsional resonance of said pair of kneading screws caused by fluctuations in load exerted on the kneading screws, the resonance suppressor serving to reduce a resonance response factor which is the ratio of an output amplitude of the kneading screws amplified by resonance response to an input amplitude of the kneading screws caused by the fluctuations in load to suppress the torsional resonance, wherein said resonance suppressor is provided between said driving motor and said second speed regulator in said motive power transmitting path, and
   said motive power transmitting path includes an input shaft through which the motive power is input into said resonance suppressor and an output shaft through which the motive power is output from said resonance suppressor, and said resonance suppressor couples the input shaft and the output shaft to each other, said resonance suppressor including a viscoelastic medium or a viscous medium which permits relative rotary motion of the input shaft and the output shaft.

7. The kneading extruder according to claim 6, wherein said motive power transmitting path includes an input shaft through which the motive power is input into said resonance suppressor and an output shaft through which the motive power is output from said resonance suppressor, and said resonance suppressor couples the input shaft and the output shaft to each other, said resonance suppressor including a viscoelastic medium or a viscous medium which permits relative rotary motion of the input shaft and the output shaft.

* * * * *